(12) United States Patent
Hilgendorf et al.

(10) Patent No.: US 10,995,695 B1
(45) Date of Patent: May 4, 2021

(54) LOW TEMPERATURE PALLET STACKER

(71) Applicant: Dennis J. Hilgendorf, Stoughton, WI (US)

(72) Inventors: Dennis J. Hilgendorf, Stoughton, WI (US); David A. Rynes, Stoughton, WI (US)

(73) Assignee: Dennis J. Hilgendorf, Stoughton, WI (US)

( * ) Notice: Subject to any disclaimer, the term of this patent is extended or adjusted under 35 U.S.C. 154(b) by 0 days.

(21) Appl. No.: 16/586,961

(22) Filed: Sep. 28, 2019

(51) Int. Cl.
| | |
|---|---|
| *B65G 59/08* | (2006.01) |
| *F02F 3/00* | (2006.01) |
| *B65G 1/08* | (2006.01) |
| *B65G 25/04* | (2006.01) |

(52) U.S. Cl.
CPC ............. *F02F 3/0084* (2013.01); *B65G 1/08* (2013.01); *B65G 25/04* (2013.01); *B65G 59/08* (2013.01); *B65G 2201/0267* (2013.01)

(58) Field of Classification Search
CPC ........ F15B 15/22; F15B 15/24; F15B 15/204; F15B 15/226; F15B 11/02; F15B 11/022; F15B 11/044; F16F 9/02; F16F 9/0227; F16F 9/0472; F16F 9/3405; F16F 9/348; F16F 9/3481; F16F 9/348202; F16F 9/561
USPC ..................................... 92/181 R, 181 P, 8, 9
See application file for complete search history.

(56) References Cited

U.S. PATENT DOCUMENTS

| | | | | |
|---|---|---|---|---|
| 4,091,488 A | * | 5/1978 | Artzberger | ......... B65G 69/2841 14/71.7 |
| 5,404,972 A | * | 4/1995 | Popjoy | ...................... F16F 9/02 188/277 |
| 5,458,047 A | * | 10/1995 | McCormick | .......... F15B 11/076 91/361 |
| 5,617,961 A | | 4/1997 | Konstant et al. | |
| 5,722,643 A | * | 3/1998 | Chamberlin | .............. F16F 9/02 188/277 |
| 5,803,482 A | * | 9/1998 | Kim | ........................ F16F 9/325 280/124.157 |
| 6,079,939 A | | 6/2000 | Smets | |
| 6,152,432 A | * | 11/2000 | Perrin | ....................... F16F 9/02 188/276 |
| 6,176,170 B1 | * | 1/2001 | Uppgard | ............. F15B 15/1476 440/61 G |

(Continued)

OTHER PUBLICATIONS

"PRD Damper Cylinder Historical Comparison," Automation Plus Division of CSF Incorporated, admitted prior art.

*Primary Examiner* — Lynn E Schwenning
(74) *Attorney, Agent, or Firm* — Stiennon & Stiennon

(57) ABSTRACT

A pallet stacker has a pivot frame which is pivotable to receive pallets in a loading position, and then to be released to rotate into an unload position where the pallets are presented in a stacked horizontal arrangement for removal by a lift or crane. A damping assembly moderates the speed of the transition of the pivot frame from the load position to the unload position and has a very small metering orifice which slows the passage of argon gas from one side of a piston head to the other within a cylinder housing when the piston is being extended, and a check valve arrangement which allows ready flow of gas from one side of the piston head to the other when the piston is being returned to the cylinder. The metering orifice and check valve may be entirely interior to the cylinder housing, or may be exterior.

14 Claims, 4 Drawing Sheets

(56) References Cited

U.S. PATENT DOCUMENTS

| | | | | |
|---|---|---|---|---|
| 6,415,706 B1* | 7/2002 | Poschl | ................ | F15B 15/1433 |
| | | | | 92/165 R |
| 6,557,456 B2* | 5/2003 | Norton | ...................... | B66F 9/22 |
| | | | | 92/85 B |
| 9,120,630 B1* | 9/2015 | Hilgendorf | ............ | B65G 25/04 |
| 2009/0277317 A1* | 11/2009 | Geoghegan | .............. | G10C 3/02 |
| | | | | 84/179 |
| 2013/0269513 A1* | 10/2013 | Estirado Vera | ........... | F16F 9/02 |
| | | | | 92/143 |
| 2014/0265203 A1* | 9/2014 | Zuleger | .................. | B60G 15/12 |
| | | | | 280/124.16 |
| 2015/0152935 A1* | 6/2015 | Ogawa | .................... | F16F 9/516 |
| | | | | 188/313 |

\* cited by examiner

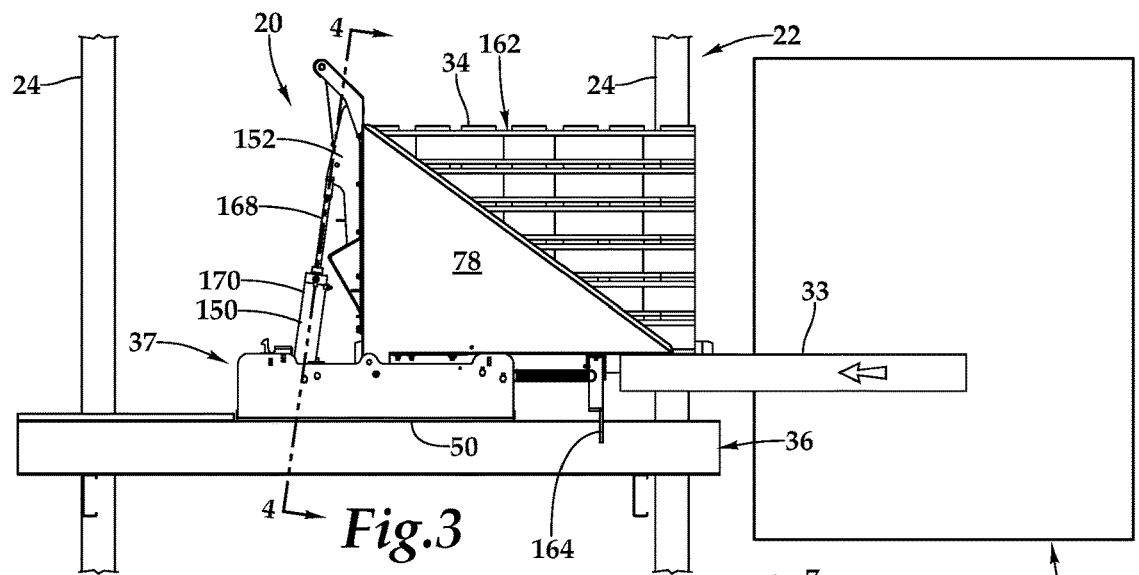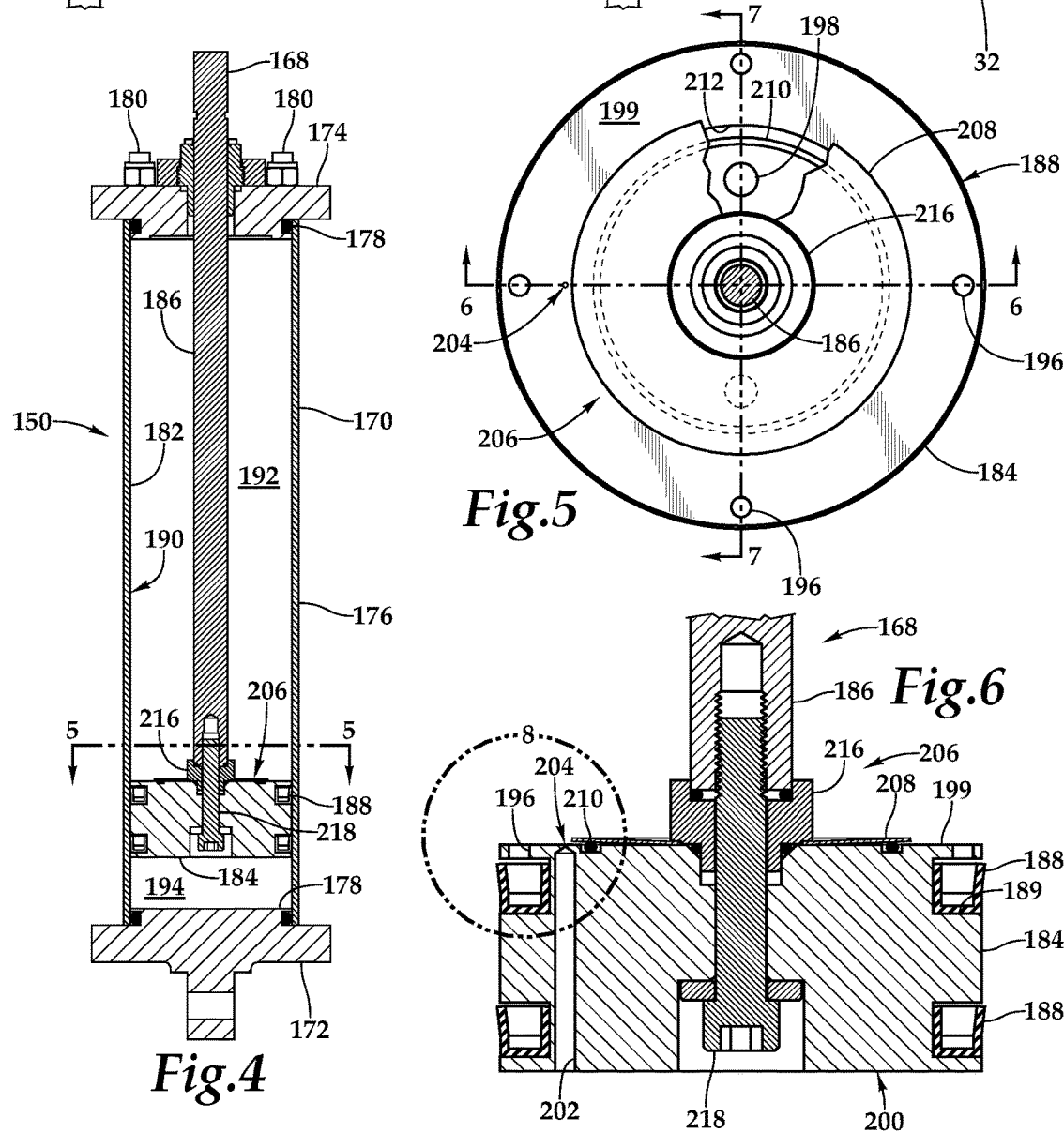

LOW TEMPERATURE PALLET STACKER

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to pallet stacking apparatus, and more particularly to such apparatus which functions in low temperature environments.

In U.S. Pat. No. 9,120,630, the disclosure of which is incorporated by reference herein, is shown a pallet stacker conveyor, which allowed workers in a distribution center to assemble depleted product pallets from a supply lane, and combine it with other empty pallets in a stack and convey it to the exterior face of the rack system for removal by a lift truck, all while reducing the lifting burden on the center worker. This invention used a conventional air cylinder which served to slow the transition from a loading position to a tilted unloading position, thereby reducing the impact on the pallets when the apparatus moved into the unloading position. However, although this conventional air cylinder was effective at room temperature, it did not function reliably at very low temperatures of as much as −20 degrees Fahrenheit such as found in refrigerated warehouses. What is needed is a pallet stacker apparatus which operates without power and which can be used reliably within refrigerated facilities.

SUMMARY OF THE INVENTION

The pallet stacker of this invention has a pivot frame which is pivotable on a base to receive pallets in a loading position, and then to be released to rotate into an unload position where the pallets are presented in a stacked horizontal arrangement for removal by a lift or crane. A damping assembly moderates the speed of the transition of the pivot frame from the load position to the unload position. The damping assembly has a very small metering orifice which slows the passage of argon gas from one side of a piston head to the other within a cylinder housing when the piston is being extended, and a check valve arrangement which allows ready flow of gas from one side of the piston head to the other when the piston is being returned to the cylinder. The metering orifice and check valve may be entirely interior to the cylinder housing, or may be exterior.

It is an object of the present invention to provide a manually operated apparatus which allows a single operator to stack and transport a number of pallets with minimal lifting which can be operated effectively within a refrigerated warehouse.

It is a further object of the present invention to provide an apparatus to assist an operator in stacking pallets and presenting them for retrieval which may be safely used in environments where food is stored and moved.

Further objects, features and advantages of the invention will be apparent from the following detailed description when taken in conjunction with the accompanying drawings.

BRIEF DESCRIPTION OF THE DRAWINGS

FIG. 3 is a side elevational view of the apparatus of FIG. 2, shown mounted in a refrigerated warehouse rack in proximity to a removal crane apparatus.

FIG. 4 is a fragmentary cross-sectional view of the apparatus of FIG. 3, showing a damper assembly in an retracted configuration.

FIG. 5 is an enlarged cross-sectional view of the piston head of the damper assembly of FIG. 4 taken along section line 5-5.

FIG. 6 is a cross-sectional view of the damper assembly elements of FIG. 5 taken along section line 6-6.

DESCRIPTION OF THE PREFERRED EMBODIMENTS

Figure 1:
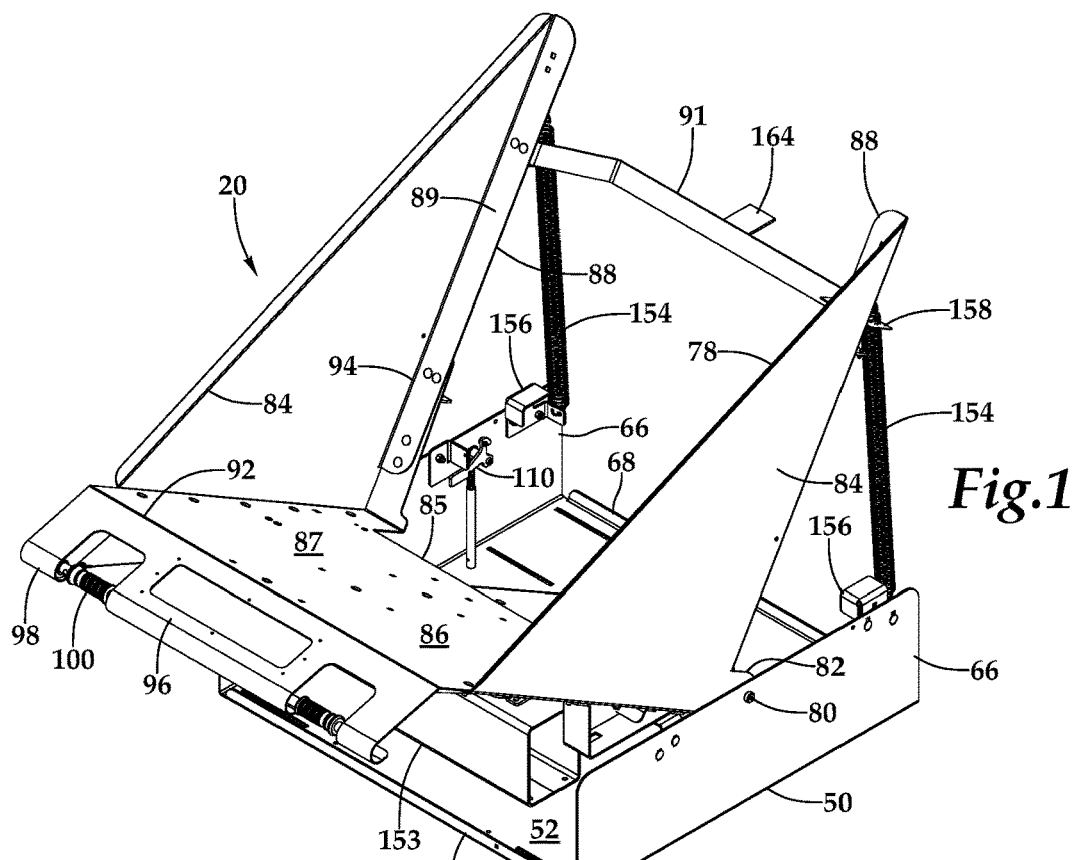
FIG. 1 is an isometric view of the pallet stacker apparatus of this invention in an unloaded configuration, shown from the loading side.

Referring more particularly to FIGS. 1-10, wherein like numbers refer to similar parts, a manual pallet stacker 20 of this invention is shown in FIG. 1. As shown in FIG. 3, the stacker 20 is mounted within a conventional rack 22 such as is commonly used in a refrigerated warehouse. The rack 22 has vertical members 24 which extend upwardly above a floor, not shown. The rack 22 is positioned alongside an unloading aisle 36 through which an apparatus for removing loads of pallets operates, for example an automated crane 32. The rack 22 will typically have multiple vertical levels spaced above a main floor. When the product on a pallet 34 has been depleted, the operator extracts the empty pallet from a rack bay containing product, and brings it along a loading aisle 37 to a return bay for assembly into a vertical stack of pallets and removal from the rack. Each return bay is outfitted with a stacker 20.

As shown in FIG. 1, the stacker 20 has a base 50 which is fixed to the rack 22. The base 50 has a planar lower wall 52, which has two upwardly extending base side members 66 which extend in the machine direction, and a front member 68 which extends upwardly in the front of the base 50 and a rear member 70 which extends upwardly at the rear of the base.

A pivot frame 78 is mounted to the base 50 about a pivot axis which extends in the cross machine direction through two bolts 80 which extend through two mounting arms 82 which extend downwardly from the pivot frame. The bolts 80 extend through the base side members 66. The pivot frame 78 is comprised of two generally triangular side members 84 which are joined by a rear member 86 which spaces the side members in the cross machine direction and parallel to one another a sufficient width to receive a plurality of pallets between the side members. The rear member 86 has a lower cut-out 85 which provides clearance for the crane 32 fork 33 to enter beneath the pallet stack.

Each side member 84 has a pallet support flange 88 extending in the machine direction and in the cross machine direction. Each pallet support flange 88 has an upper surface 89 which is positioned to engage the lowermost pallet in a stack of pallets to be handled.

The pallet support flanges 88 are connected by a front brace 91 which extends in the cross machine direction and which joins and stiffens the support flanges, while being spaced below the level of the pallets stacked on the flanges 88 and further providing clearance for entry of the crane fork 33. The rear member 86 has an interior surface 87 which is approximately perpendicular to the upper surfaces of the pallet support flanges 88, thus a 90 degree angle is defined between the rear member 86 and the pallet support flanges 88.

The mounting arms 82 may be formed as parts of the side members so as to extend downwardly from the triangular side members. Although the pivot frame may be formed as a weldment, it may be assembled with fasteners from sheet metal parts, allowing the pivot frame to be knocked down for compact shipping prior to installation.

As best shown in FIG. 1, the rear member 86 has an upper inlet edge 92. The pivot frame 78 defines an interior 94 which can receive pallets therein. The pivot frame 78 is pivotable on the bolts 80 between a first position, shown in FIG. 1, where the rear member 86 is tilted towards the load station and the pallet flanges extend generally upwardly, and a second position, shown in FIG. 2, in which the rear member 86 is generally perpendicular to the base 50 and the pallet flanges are parallel to the base lower wall 52. In the first position, the rear member interior surface 87 is disposed at an angle of from 20 to 45 degrees with respect to the plane of the base lower wall 52, and is preferably about 30 degrees.

Figure 2:
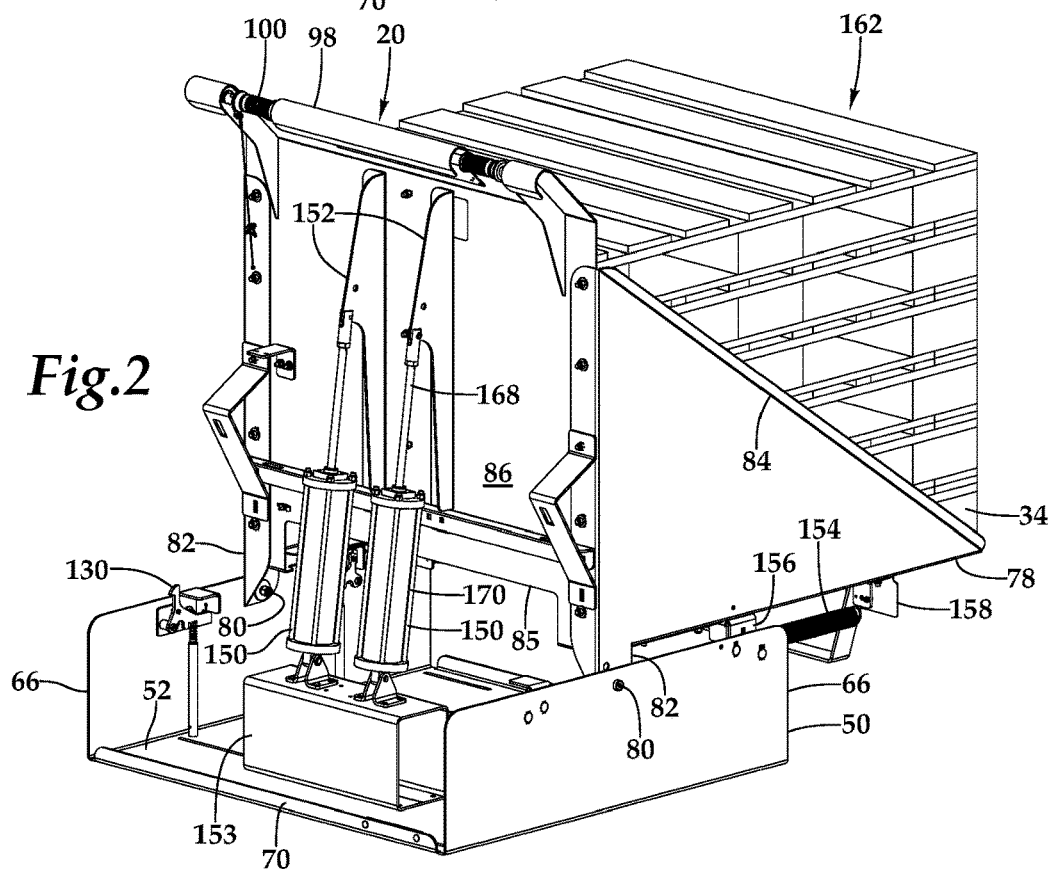
FIG. 2 is an isometric view of the pallet stacker apparatus of FIG. 1 in a loaded configuration, shown from the loading side.

A ledge 96 projects rearwardly of the rear member 86, and extends from the rear member upper edge 92 at an angle greater than 180 degrees from the interior surface 87 of the rear member 86. This angle may be between 215 to 240 degrees, measured from the surface 87. The ledge 96 may be formed from the same sheet metal element as the rear member 86. The ledge 96 is terminated by a semicylindrical housing 98 which receives a rotatable handle 100, shown in FIG. 1. The housing 98 projects beyond the handle 100 such that a pallet may be loaded across the housing, as shown in FIG. 2, without interfering with the handle. In addition to providing a position for applying force to rotate the pivot frame 78 in the machine direction, the handle 100 is also connected by cable linkages to two latches which selectively retain the pivot frame 78 in the loading position or the unloading position.

A front latch assembly 110, shown in FIG. 1, releasably retains the pivot frame in the unload condition. A rear latch assembly 130, shown in FIG. 2, may be actuated by rotation of the handle 100 to selectively retain the pivot frame 78 in the loading position. Both the front latch assembly 110 and the rear latch assembly 130 are actuated by cables (not shown) engaged with the handle, such that rotation of the handle causes both the front latch assembly and the rear latch assembly to be simultaneously operated.

As shown in FIG. 4, to reduce the impact of the change in position of the pivot frame and to serve as a shock absorber, one or more damper assemblies 150 extend between the base 50 and a cylinder bracket 152 which projects rearwardly of the rear member 70 of the pivot frame. A single white wood pallet can weigh 35-50 pounds, and a CHEP pallet can weigh 80 pounds. A stack may have seven pallets. A single damper assembly 150 may be adequate to handle white wood pallets, while a unit for PECO or CHEP pallets may require two damper assemblies. The damper assemblies 150 may be connected to the base wall 42 directly, or to a platform 153 fixed to the base as illustrated, depending on the configuration of the removal crane 32. Each damper assembly 150 is comprised of an extensible piston 168 pivotably mounted to the bracket 152 and a cylinder housing 170 pivotably mounted to the platform 153. As shown in FIGS. 4-8 the damper assembly is configured for reliable operation under the low temperature conditions found in refrigerated warehouses, where temperatures may reach −20 degrees Fahrenheit or lower. The damper assembly 150 cylinder housing 170 has a cylinder tail 172 at one end of a cylinder tube 176, and a cylinder head 174 at the other end. As shown in FIG. 4, the cylinder tail 172 and cylinder head 174 are engaged with O-rings 178 at the ends of the tube 176 and four bolts connect the cylinder head and the cylinder tail, thereby forming a sealed interior 182 within the tube 176 which is filled with an inert gas, preferably argon. The piston 168 has a piston head 184 which is fixed to a piston shaft 186. The piston head 184 travels within the interior 182 of the cylinder, and is provided with two low-temperature seals or gaskets 188 seated within two circumferential sidewardly opening channels 189 which engage against an inner wall 190 of the cylinder tube 176 and form a gas tight seal between the piston head and the cylinder tube, and thereby divide the cylinder interior into a first volume 192 on the side of the piston head adjacent the shaft and between the piston head and the cylinder head 174, and a second volume 194 between the piston head and the cylinder tail 172. The seals are formed of a resilient material with a generally U-shaped cross section that faces towards the first volume. The piston head 184 may be provided with four openings 196 which pass through the shaft side surface 199 of the piston head and communicate between the first volume and one of the seals 188, the openings serving to facilitate piston sealing. The seals do not require any oil, and hence the damper assembly 150 advantageously operates without any oil whatsoever, a beneficial attribute when used in cold storage warehouses where food is stored, as in some circumstances some types of oil are prohibited.

Figure 7:
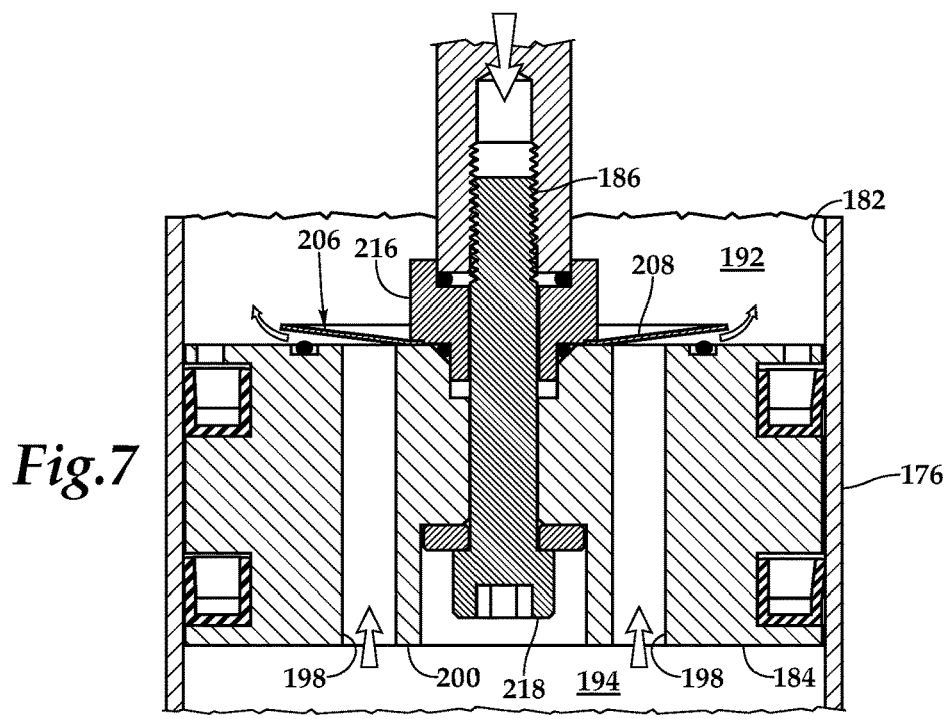
FIG. 7 is an enlarged fragmentary cross-sectional view of the damper assembly of FIG. 5 taken along section line 7-7.
Figure 8:
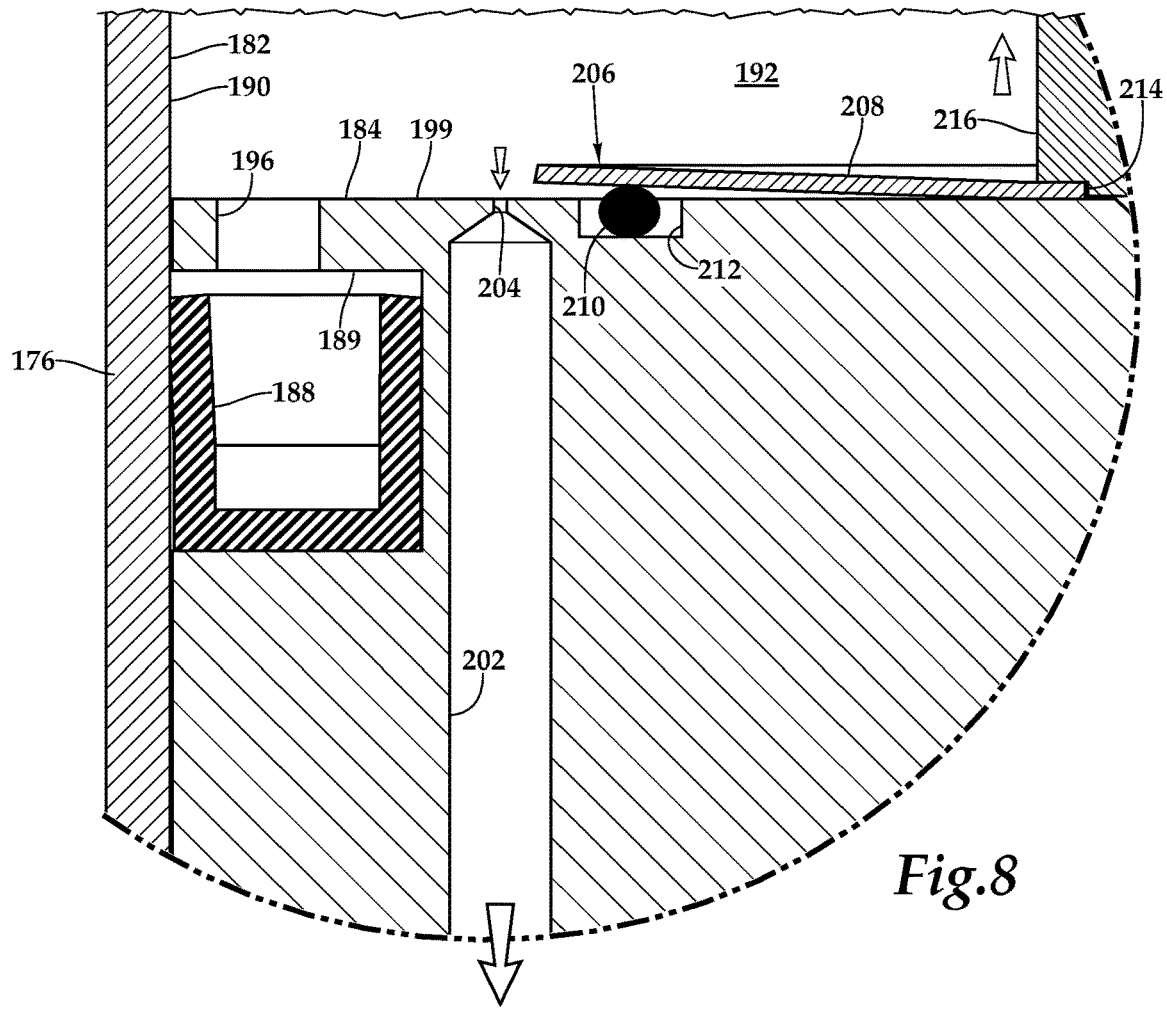
FIG. 8 is an enlarged view of the portion 8 of the cross-sectional view of FIG. 6.

The piston head 184 has three passageways that permit the exchange of gas between the first volume 192 and the second volume 194. As shown in FIG. 7, two constant diameter passageways 198 extend through the piston head between the shaft side surface 199 and a tail side surface 200 and serve as flow return ports. These passageways 198, when open, provide substantially unrestricted flow of gas from the second volume to the first volume, and may have a diameter of about 0.25 inches. As shown in FIG. 8, a flow metering passageway 202 extends between the shaft side surface 199 of the piston head and the tail side surface 200. At the shaft side surface 199, the flow metering passageway 202 narrows down to a flow metering orifice 204 which is significantly smaller than the diameter of the flow return port passageways 198, for example about 0.0098 inches. This orifice 204 is sufficiently small that it restricts the flow of gas from the first volume 192 to the second volume, with the result that the velocity of travel of the piston 168 is moderated.

Gas in the first volume 192 is restricted from flowing through the flow return port passageways 198 by a valve 206 mounted to the piston 168. As shown in FIG. 7, the valve 206 has a thin disc 208 which overlies the shaft side surface 199 of the piston head 184 and which engages an O-ring 210 which is received within an annular groove 212 which encircles the shaft 186. The disc may be fabricated of 0.020 inch thick steel. The valve disc 208 has an interior circular opening 214. A cylindrical fitting 216 extends through the disc opening 214 and into a relief in the piston head, and which overlies a portion of the disc 208. The shaft 186 extends into the fitting 216 and is secured to the piston head by a bolt 218 which threadedly engages the shaft interior. O-rings are positioned between the fitting and the shaft head, and between the shaft and the fitting. The threaded engagement between the bolt 218 and the piston head thus secures the inner perimeter of the valve disc 208 around the shaft 186, and urges the valve disc 208 against the O-ring 210. As shown in FIGS. 5 and 7, when the valve disc 208 is sealed against the O-ring 210, gas may only pass from the first volume 192 to the second volume 194 through the flow metering orifice 204. This will be the arrangement when the piston is being withdrawn from the cylinder 170, as when the pivot frame 78 is being pivoted from the load to the unload position. When the piston is being urged back into the cylinder tube 176, as shown in FIG. 7, the piston head is being urged into the second volume and the gas within the second volume is being compressed. When this happens there is sufficient pressure to deflect the very thin valve disc 208 away from the O-ring 210 thereby opening a clear unimpeded flow through the flow return port passageways 198 and allowing substantially unimpeded motion of the piston head 184 and the connected shaft 186, which means the pivot frame 78 can be restored to the load position with little resistance from the damper assemblies 150.

The damper assembly 150 is thus particularly well suited to low temperature operation, as it is sealed so that there is no exchange of ambient air with the interior of the cylinder. At low temperatures any water vapor can be expected to condense and freeze, so it is advantageous that no ambient air is part of the working fluid of the damper assembly.

As shown in FIGS. 1 and 2, the pivot frame 78 is biased to the unload position by two extension springs 154. The springs 154 extend between spring brackets 156 fixed to the front of the base side members 66, and spring brackets 158 which extend downwardly from the pivot frame pallet support flanges 88.

The stacker 20 makes it possible for an operator to assemble a vertical stack of pallets without electrical, pneumatic, or hydraulic assistance, and without having to directly lift the individual pallets onto a vertical stack. With the pivot frame retained in the first position for loading by the rear latch assembly 130, the operator brings an empty pallet 34 along the aisle to the floor at the foot of the stacker 20. The operator may be able to drag or skid the pallet 34 to this position. The pallet 34 is then leaned up against the handle housing 98. With a portion of the weight of the pallet supported on the handle housing 98, the operator slides the pallet upwardly until the pallet's center of mass passes over the ledge 96 at which point the weight of the pallet causes it to pivot and be supported on the ledge. After this point the operator need no longer lift the pallet, but is instead urging the pallet frontwardly in the machine direction. When the pallet's center of mass passes beyond the upper inlet edge 92 of the rear member of the pivot frame 78, the pallet will pivot again and descend into the pivot frame interior. With the pallet extending along the interior surface 87 of the pivot frame rear member, the upper edge of the pallet extends above the handle housing where it is readily accessible to the operator who gives it a strong push to cause the pallet to pivot from lying along the interior surface of the rear member to lying along the oppositely inclined pallet support flanges 88. Subsequent pallets are introduced into the pivot frame interior in a similar manner, although these pallets will engage against the underlying pallets of the stack rather than the pallet support flanges.

When enough pallets have been received within the carriage to form a stack of the desired height, the operator engages the handle 100 and rotates it to release the rear latch assembly 130, at which point the extension springs 154 act to rotate the pivot frame about the bolts 80 into the second position where the pallets in the stack 162 are substantially parallel to the lower wall 52 of the base 50. As discussed above, the damper assemblies 150 serve to slow the transition from the first position to the second position, reducing the impact on the pallets when the pivot frame swings into the second position. This is particularly critical as the clearance between the pallet stack 162 and the travelling crane 32 in the unload aisle is often tight. If there is too great an impact on the pallet stack 162 from the rotation of the pivot frame into the unload position, it is possible that the pallets will shift and project into the unload aisle, where there is a danger that a pallet could interfere with the progress of the crane, or even cause damage to the crane or its attached equipment.

As shown in FIGS. 1 and 3, a mounting plate 164 extends downwardly from the brace 91 and is provided with a strip of reflective material. When the pivot frame is in the unload condition, the reflective material on the mounting plate 164 is detectable by a sensor system associated with the crane, which indicates to the crane controller that a load of pallets needs to be picked up.

The pallet stack 162 in the unload position is readily engaged by the crane 32 fork 33 as shown in FIG. 3. The fork 33 extends beneath the pallet stack 162 and above the brace 91, it can then be lifted to engage the pallet stack, remove it from the rack 22, and transport it elsewhere.

Once a pallet stack 162 has been removed by the crane 32, the pivot frame handle is engaged and the pivot frame 78 is returned to the load position and latched in place. Once the pivot frame 78 is returned to the first position, it may be loaded again with additional pallets.

Figure 9:
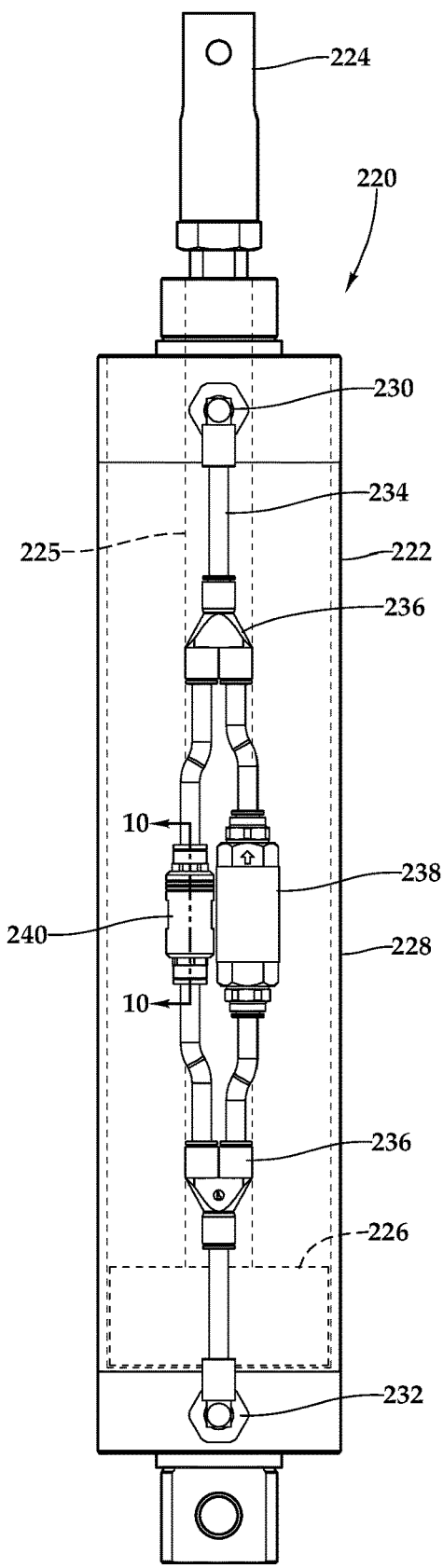
FIG. 9 is a side view of an alternative embodiment damper assembly for the pallet stacker of this invention.
Figure 10:
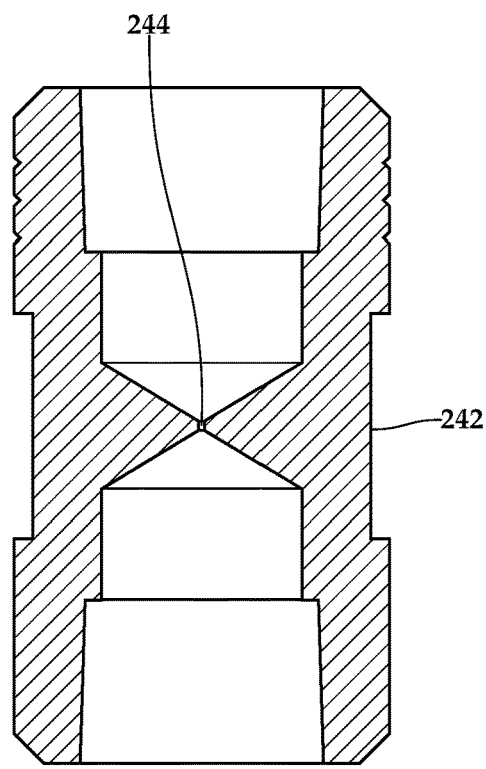
FIG. 10 is a cross-sectional view of the damper assembly of FIG. 9 taken along section line 10-10 and showing only a flow metering orifice fitting.

An alternative embodiment damper assembly 220 is shown in FIGS. 9 & 10 which uses a conventional pneumatic cylinder 222 with external flow tubing. The pneumatic cylinder 222 has an extensible piston 224 with a piston shaft 225 fixed to a piston head 226 which divides the housing 228 into a first volume on the piston side of the head, and a second volume which is on the opposite side of the head. The head may be, for example, three inches in diameter with a ⅝ inch diameter shaft. There is no communication through the head 226 between the first volume and the second volume. Instead, an external flow connection is made through tubing 234 between a first fitting 230 in communication with the first volume and a second fitting 232 in communication with the second volume. Two flow splitters 236 are connected in the tubing 234 to form two flow passages 238, 340. In one flow passage 238 a check valve is disposed which allows substantially unimpeded flow from the second volume to the first volume. In the other flow passage 240, there is disposed a fitting 242, shown in FIG. 10, which narrows down to a very small diameter at a flow metering orifice 244, for example about 0.0098 inches. Hence, when the flow goes from the first volume to the second volume, when the piston is being extended, it must pass through the flow metering orifice 244 and the speed of extension is moderated.

It should be noted that although the damper assembly is disclosed as being filled with argon, other inert gases may be used, including nitrogen.

It is understood that the invention is not limited to the particular construction and arrangement of parts herein illustrated and described, but embraces all such modified forms thereof as come within the scope of the following claims.

We claim:

1. A pallet stacker comprising:
a base which is mounted between a loading aisle and an unloading aisle, a machine direction being defined extending from the loading aisle to the unloading aisle;
a pivot frame pivotably mounted to the base about a pivot axis which extends in a cross machine direction, the pivot frame having structure to receive and support a plurality of pallets thereon, and being pivotable between a first position accessible from the loading aisle where it may receive pallets, and a second position accessible from the unloading aisle where a stack of pallets may be removed from the pivot frame;
at least one biasing member extending between the pivot frame and the base to urge the pivot frame towards the second position;
a damping assembly having a housing with a piston extensible from the housing, wherein the damping assembly is connected between the pivot frame and the base, with the housing pivotably connected to one of the pivot frame and the base, and the piston connected to the other of the pivot frame and the base, wherein the housing has an interior with a wall, the housing receiving a head mounted to the piston for axial travel within the housing; the head having at least one flexible seal which engages the wall to divide the housing interior into a head side volume and a piston side volume;
portions of the head which define a first channel which extends through the head, the first channel having a first minimum cross-sectional area;
portions of the head which define a third channel spaced from the first channel and which extends through the head, the third channel having a third minimum cross-sectional area;
a valve disc mounted to the head to overlie the first channel and the third channel within the piston side volume and to engage against a seal, thereby forming a check valve and to prevent the passage of gas therethrough when the piston is being extended from the housing, and to allow the passage of gas through the first channel when the piston is being returned to the housing; and
portions of the head which define a second channel positioned radially outwardly of the valve disc and which extends through the head, the second channel having a second minimum cross-sectional area defining a flow metering orifice which is significantly smaller than the first minimum cross-sectional area and the third minimum cross-sectional area, such that when the piston is being extended from the housing, gas from the piston side volume flows through the gas metering orifice to the head side volume, thereby moderating the speed with which the piston extends from the housing, and flow of gas is substantially unrestricted though the first and third channels when the check valve is open.

2. The pallet stacker of claim 1 wherein the damping assembly housing interior is filled with an inert gas.

3. The pallet stacker of claim 2 wherein the inert gas is argon.

4. The pallet stacker of claim 1 wherein the second minimum cross-sectional area is a circle with a diameter of about 0.0098 inches.

5. The pallet stacker of claim 1 wherein the piston has a shaft mounted to the head, and wherein the valve disc has a central opening through which the piston shaft extends, and the seal between the valve disc and the head further comprises:
a groove in the head opening into the piston side volume, and encircling the piston;
an O-ring disposed within the groove; and
a fitting fixed with respect to the piston shaft and clamped against the valve disc.

6. The pallet stacker of claim 1 wherein there is no oil within the damping assembly housing.

7. The pallet stacker of claim 1 wherein the ratio of the combined area of the first minimum area and the third minimum area to the second minimum area is about 1,300:1.

8. A pallet stacker comprising:
a base which is mounted between a loading aisle and an unloading aisle, a machine direction being defined extending from the loading aisle to the unloading aisle;
a pivot frame pivotably mounted to the base about a pivot axis which extends in a cross machine direction, the pivot frame having structure to receive and support a plurality of pallets thereon, and being pivotable between a first position accessible from the loading aisle where it may receive pallets, and a second position accessible from the unloading aisle where a stack of pallets may be removed from the pivot frame;
at least one biasing member extending between the pivot frame and the base to urge the pivot frame towards the second position;
a damping assembly having a housing with a piston extensible from the housing, wherein the damping assembly is pivotably mounted between the base and the pivot frame, wherein the housing has an interior with a wall, the housing receiving a head mounted to the piston for axial travel within the housing; the head having at least one flexible seal which engages the wall to divide the housing interior into a head side volume and a piston side volume, wherein the damping assembly is sealed to exclude entry of gas from an ambient atmosphere;
wherein the head has a plurality of passageways extending through the head and communicating between the head side volume and the piston side volume;
portions of the damping assembly which define a check valve positioned in flow communication between the head side volume and the piston side volume, the check valve positioned to block flow from the piston side volume to the head side volume through all but one of the passageways, and permitting flow from the head side volume to the piston side volume through one of the passageways; and
wherein the flow through the one passageway not subject to being blocked by the check valve is restricted by portions of the head defining a flow metering orifice communicating between the piston side volume and the head side volume, the flow metering orifice having an orifice minimum area which is sufficiently small to slow the extension of the piston from the damping assembly such that the pivot frame completes its transition from the first position to the second position under the urging of the biasing member without dislodging pallets from a stack, and wherein the ratio of the orifice minimum area to the minimum area of those of the passageways subject to being blocked by the check valve is about 1,300:1.

9. The pallet stacker of claim 8 wherein the inert gas is argon.

10. The pallet stacker of claim 8 wherein there is no oil within the damping assembly housing.

11. The pallet stacker of claim 8 wherein the diameter of the flow metering orifice is about 0.0098 inches.

12. The pallet stacker of claim 8 wherein the plurality of passageways comprises portions of the head of the piston which define a first channel which extends through the head having a first minimum cross-sectional area, portions of the head which define a third channel which extends through the head having a second minimum cross-sectional area, and a third channel which extends through the head, having a third minimum cross-sectional area and wherein the check valve further comprises:
- a valve disc mounted to the head to overlie the first channel and the third channel within the piston side volume and to engage against a seal and prevent the passage of gas therethrough when the piston is being extended from the housing, and to allow the passage of gas through the first channel and the third channel when the piston is being returned to the housing, wherein the second minimum cross-sectional area is significantly smaller than the first minimum cross-sectional area and the third minimum cross-sectional area, such that velocity of travel of the piston is moderated when gas flows through the second channel, and flow of gas is substantially unrestricted though the first and third channels when the check valve is open.

13. The pallet stacker of claim 12 wherein the valve disc has a central opening through which the piston shaft extends, and the seal between the valve disc and the head further comprises:
- a groove in the head opening into the piston side volume, and encircling the piston;
- an O-ring disposed within the groove; and
- a fitting fixed with respect to the piston shaft and clamped against the valve disc.

14. The pallet stacker of claim 12 wherein the valve disc is fabricated of 0.020 inch thick steel.

* * * * *